United States Patent
Spera et al.

(10) Patent No.: US 9,932,057 B2
(45) Date of Patent: Apr. 3, 2018

(54) PALLET JACK MOUNTING SYSTEM

(71) Applicant: Havis, Inc., Warminster, PA (US)

(72) Inventors: Pete Spera, Holland, PA (US); Keith Davis, Huntingdon Valley, PA (US); Dave Enama, Jamison, PA (US)

(73) Assignee: Havis, Inc., Warminster, PA (US)

( * ) Notice: Subject to any disclaimer, the term of this patent is extended or adjusted under 35 U.S.C. 154(b) by 113 days.

(21) Appl. No.: 15/040,154

(22) Filed: Feb. 10, 2016

(65) Prior Publication Data

US 2017/0225626 A1 Aug. 10, 2017

(51) Int. Cl.
*B62B 3/10* (2006.01)
*B62B 3/06* (2006.01)

(52) U.S. Cl.
CPC . *B62B 3/10* (2013.01); *B62B 3/06* (2013.01)

(58) Field of Classification Search
CPC .. B62L 33/1408; B62L 3/1412; B62L 3/1416; B62L 3/1424; B62L 3/06; B62L 3/0606; B62L 3/0612; B62L 5/0096; B62L 2203/20; B60R 11/0241; B60R 2011/0294; B60R 11/0229; B60R 11/0252
USPC .............. 224/545–572, 539, 42.32–42.39; 248/177.1, 178.1, 229.17, 227.1, 228.8, 248/230.8, 187.1, 188.1
See application file for complete search history.

(56) References Cited

U.S. PATENT DOCUMENTS

| | | | | |
|---|---|---|---|---|
| 4,136,904 A | * | 1/1979 | Lauderdale | B60R 11/06 224/402 |
| 5,623,750 A | * | 4/1997 | Nasin | B60P 7/0823 224/318 |
| 5,769,112 A | * | 6/1998 | Rendina | E03B 9/04 137/272 |
| 6,457,618 B1 | * | 10/2002 | Hancock | B60R 7/14 224/319 |
| 7,810,821 B2 | * | 10/2010 | Trine | B62B 3/06 187/231 |
| 2003/0197351 A1 | * | 10/2003 | Burger | B62B 3/0612 280/651 |
| 2013/0062384 A1 | * | 3/2013 | Phillips | B60R 9/10 224/500 |
| 2016/0185304 A1 | * | 6/2016 | Pedrini | B60R 9/10 224/572 |

* cited by examiner

*Primary Examiner* — Nathan J Newhouse
*Assistant Examiner* — Scott McNurlen
(74) *Attorney, Agent, or Firm* — RatnerPrestia

(57) ABSTRACT

Apparatuses and methods for mounting an object to a pallet jack are disclosed. One apparatus includes a base, a hook, and a clamping element. The base is sized to be positioned on a head of the pallet jack. The hook is sized to engage an underside of the pallet jack. The hook is movably coupled to a front of the base such that a distance between the base and the hook is adjustable. The clamping element is coupled to a rear of the base. At least a portion of the clamping element is positioned to extend underneath the head of the pallet jack when the base is positioned on the head of the pallet jack.

16 Claims, 5 Drawing Sheets

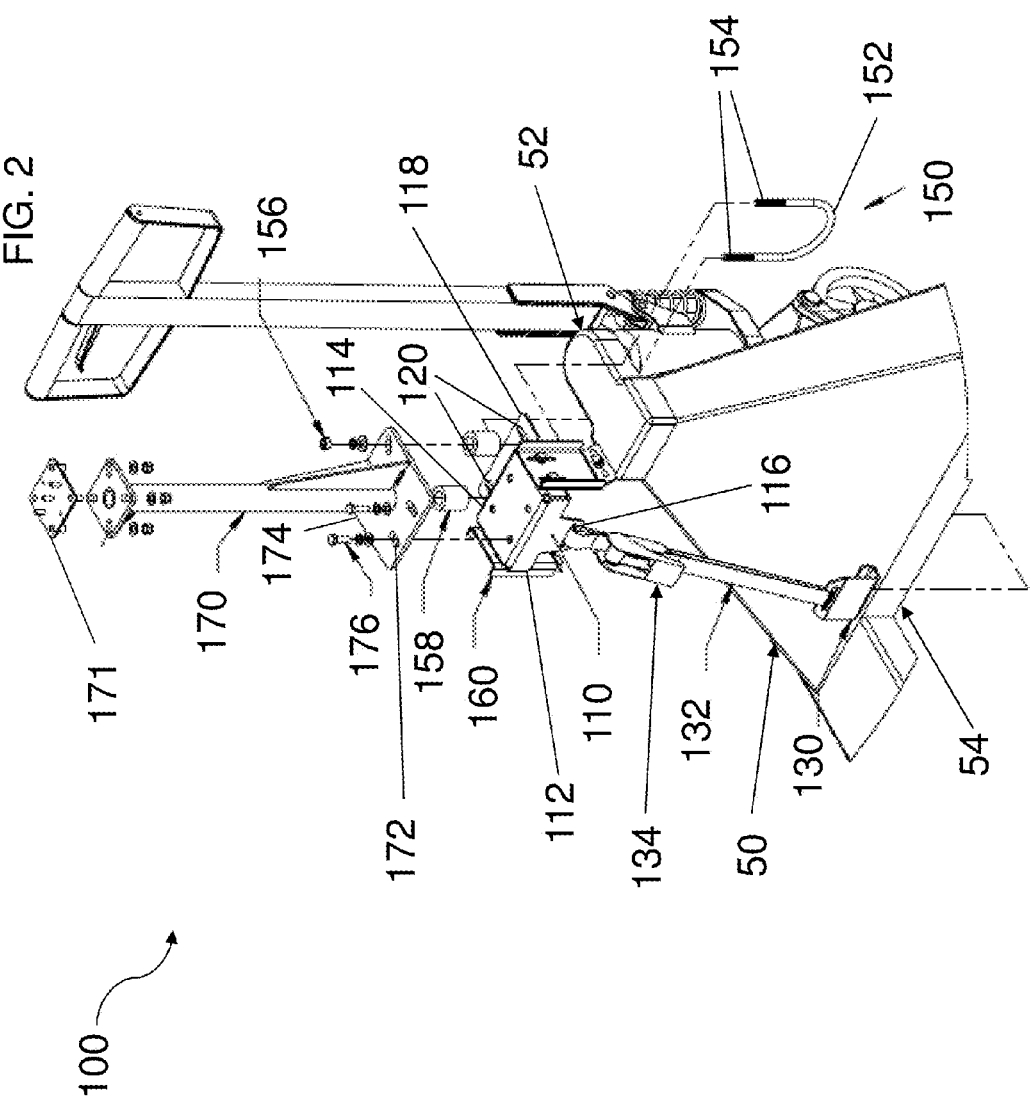

PALLET JACK MOUNTING SYSTEM

FIELD OF THE INVENTION

The present invention relates generally to mounting systems, and more particularly, to apparatuses and methods for removably mounting objects to a pallet jack.

BACKGROUND OF THE INVENTION

A number of specialized tools and equipment have been developed in recent years for use in moving and tracking inventory. For example, fork lifts and pallet jacks may be employed to enable fewer workers to efficiently move or organize large or numerous items. Nonetheless, a need remains for enabling more easy and efficient movement and tracking of inventory.

SUMMARY OF THE INVENTION

Aspects of the present invention are directed to apparatuses and methods for mounting an object to a pallet jack.

In accordance with one aspect of the present invention, an apparatus for mounting an object to a pallet jack is disclosed. The apparatus includes a base, a hook, and a clamping element. The base is sized to be positioned on a head of the pallet jack. The hook is sized to engage an underside of the pallet jack. The hook is movably coupled to a front of the base such that a distance between the base and the hook is adjustable. The clamping element is coupled to a rear of the base. At least a portion of the clamping element is positioned to extend underneath the head of the pallet jack when the base is positioned on the head of the pallet jack.

In accordance with another aspect of the present invention, a method for mounting an object to a pallet jack is disclosed. The method includes positioning a base of a mounting apparatus on a head of the pallet jack, engaging an underside of the pallet jack with a hook movably coupled to the base, adjusting a distance between the hook and the base, and clamping the base to the head of the pallet jack with a clamping element positioned to extend underneath the head of the pallet jack.

In accordance with yet another aspect of the present invention, a pallet jack is disclosed. The pallet jack has a pallet jack body, forks, a handle, a base, a hook, and a clamping element. The pallet jack body has a head. The forks are coupled to the pallet jack body and positioned forward of the head. The handle is coupled to the pallet jack body and positioned rearward of the head. The base is positioned on the head. The base comprises a mounting surface for mounting an object directly or indirectly to the base. The hook engages an underside of the pallet jack body between the forks. The hook is movably coupled to the base such that a distance between the base and the hook is adjustable. The clamping element is coupled to the base. At least a portion of the clamping element extends underneath the head to clamp the base to the head.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures:

FIG. 2 is an exploded view of the apparatus of FIGS. 1A-1C;

DETAILED DESCRIPTION OF THE INVENTION

The apparatuses and methods disclosed herein are usable to mount objects to a pallet jack. Generally, a pallet jack includes a wheeled body having a head, forks positioned forward of the head, and a handle positioned rearward of the head. The forks are coupled to jack for raising and lowering heavy objects. The handle is used to move and steer the pallet jack body to move or raise the heavy objects held on the forks. Suitable pallet jacks for use with the present invention, including conventional equipment designed to lift and move large items, will be known to one of ordinary skill in the art from the description herein.

While essentially any object or objects may be mounted within the disclosed apparatus and methods, the disclosed mounting systems are particularly suitable for mounting electronic devices, such as tablets or mobile phones. It may be desirable to mount electronic devices to a pallet jack in order to facilitate easier tracking, monitoring, or recording of inventory movements by a user of the pallet jack. Additionally, mounting electronic devices to a pallet jack may be useful to provide up-to-date instructions and or guides to a user of the pallet jack for moving inventory.

Additionally, electronic devices may be subject to periodic removal from the pallet jack, and as such, the disclosed apparatuses and methods advantageously allow such objects to be securely mounted to a pallet jack while still being capable of being easily removed when desired. Other electronic devices or objects mountable with the disclosed systems will be known to those of ordinary skill in the art from the description herein.

Figure 1A:
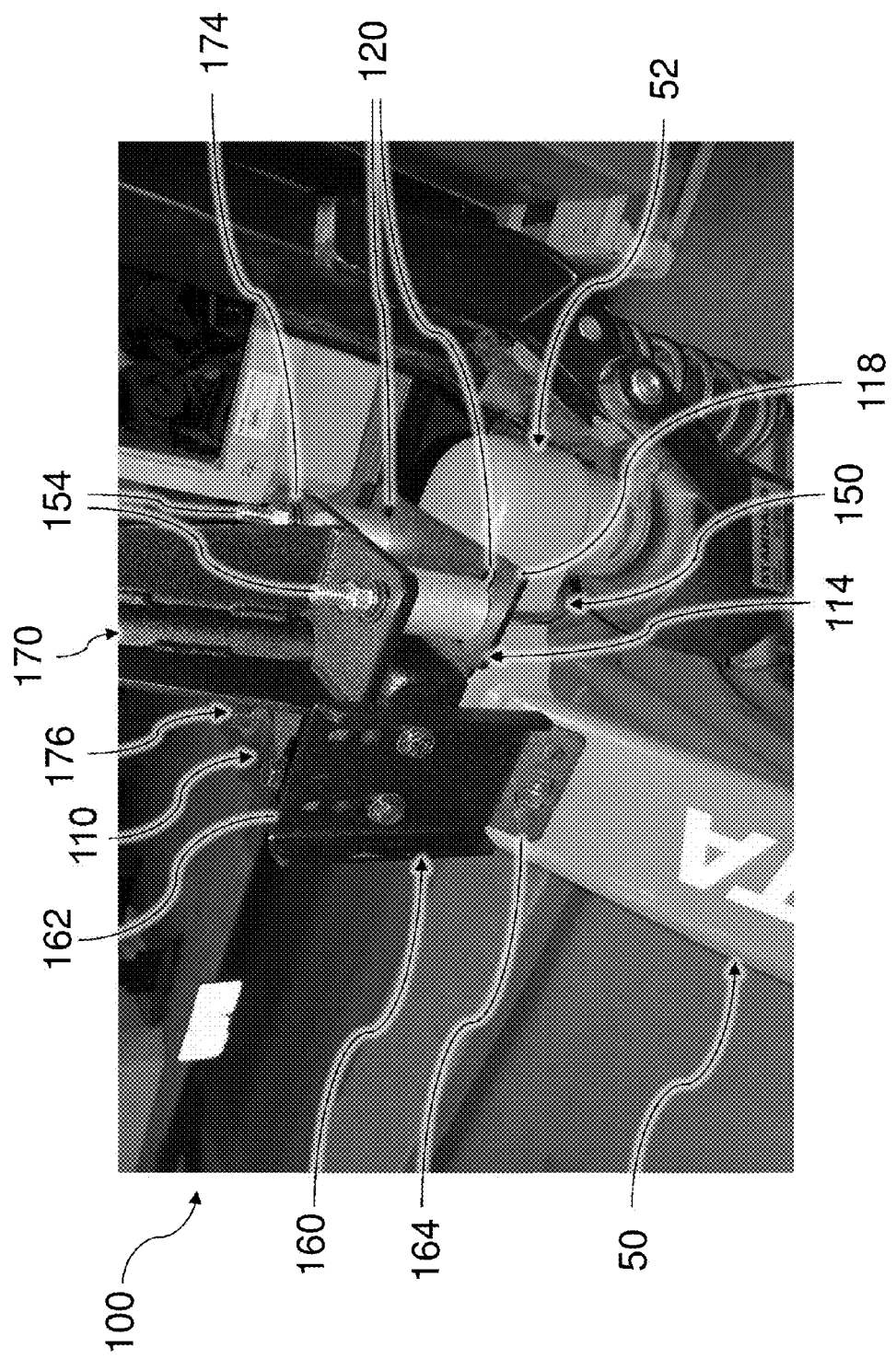
FIGS. 1A, 1B, and 1C are views of an exemplary apparatus for mounting an object to a pallet jack in accordance with aspects of the present invention.
Figure 1B:
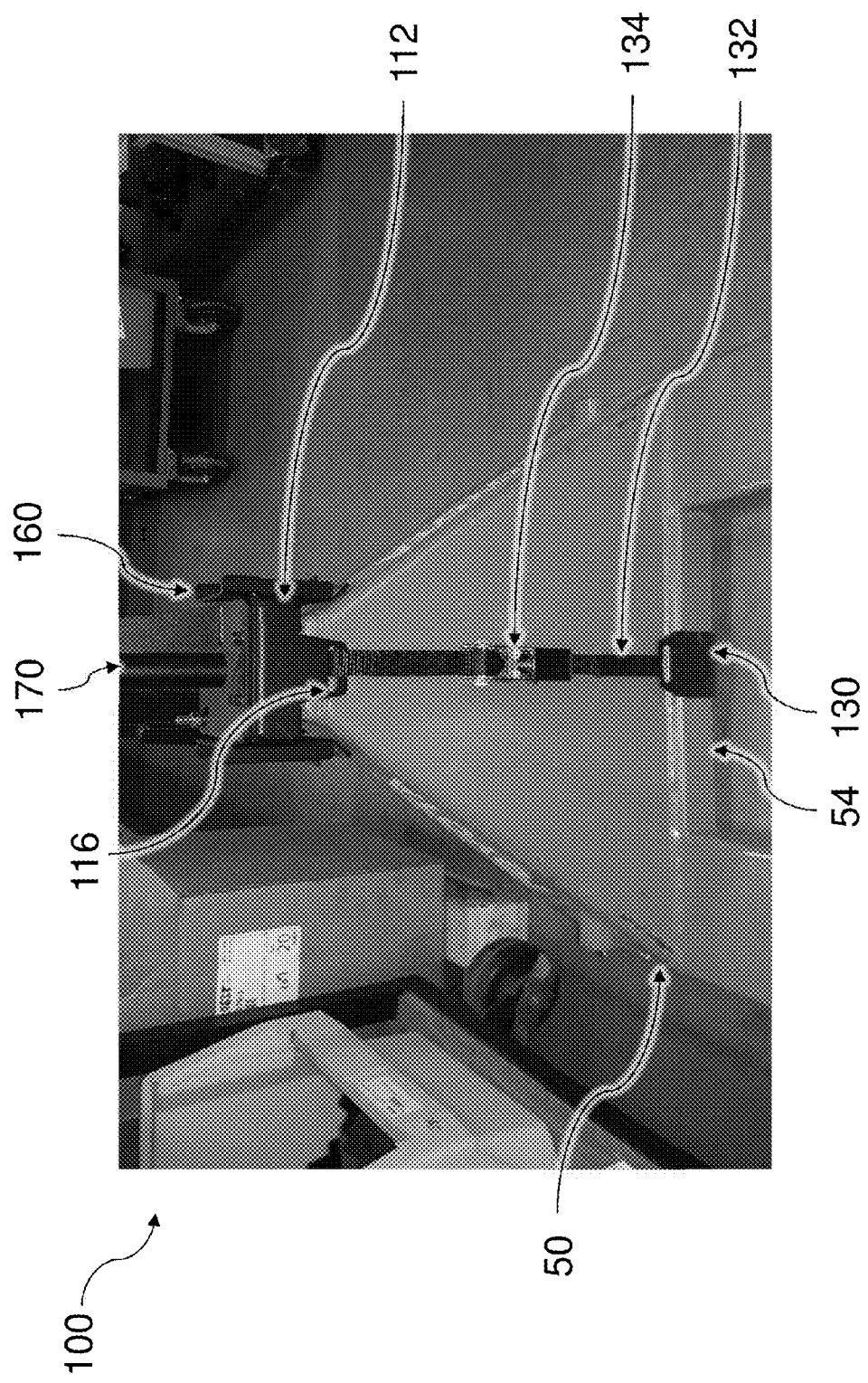

With reference to the drawings, FIGS. 1A-2 illustrate an exemplary apparatus 100 for mounting an object to a pallet jack 50 in accordance with aspects of the present invention. Apparatus 100 is usable to securely mount objects, such that they can be readily secured to or removed from pallet jack 50. Apparatus 100 is usable to securely mount electronic devices such as tablets and phones. In general, apparatus 100 includes a base 110, a hook 130, and a clamping element 150. Additional details of apparatus 100 are provided herein.

Base 110 supports the components of apparatus 100. Base 110 is sized to be positioned on the head 52 of pallet jack 50. Head 52 of pallet jack 50 may have a substantially flat upper surface or a rounded upper surface. Base 110 may have a flat lower surface or may have a lower surface that is contoured to correspond to the upper surface of head 52. Base 110 may be formed from a rigid material or may be partially or fully flexible in order to conform to the contour of head 52 of pallet jack 50. For example, base 110 may be formed from one or more pieces of metal such as steel. Other suitable materials for forming base 110 will be apparent to one of ordinary skill in the art. Base 110 may be formed a single component or may be formed from one or more components, e.g., a contoured piece configured to engage the head 52 of the pallet jack 50 coupled to a support structure configured to engage the hook 130 and clamping element 150. Other suitable configurations will be understood by one of skill in the art from the description herein.

Base 110 further provides a foundation for mounting the object to be mounted to pallet jack 50. For example, base 110 may include a mounting surface on its upper surface. The object to be mounted may be mounted directly to the mounting surface of base 110, or may be mounted to the mounting surface of base 110 through one or more adaptor structures. Suitable adaptor and/or mounting structures for facilitating the mounting of the object to base 110 are disclosed in copending U.S. patent application Ser. No. 14/745,839 and U.S. patent application Ser. No. 14/755,354, the contents of each of which are incorporated herein by reference in their entirety. Other suitable adaptor and/or mounting structures for mounting an object to base 110 will be known to one of ordinary skill in the art from the description herein.

In an exemplary embodiment, base 110 has a front side 112 and a rear side 114. Front side 112 of base 110 includes a slot 116 for connection with hook 130, as will be described below. Rear side 114 of base 110 includes a flange 118. Flange 118 includes a pair of holes 120 for connection with clamping element 150, as will be described below.

Hook 130 is sized to engage an underside 54 of pallet jack 50. Hook 130 is not limited to any particular shape or size. To the contrary, hook 130 may have any shape or size suitable for engaging a recess, lip, or other similar edge of pallet jack 50. Likewise, the term "underside" as used herein is intended to refer to any portion of pallet jack 50 positioned below head 52. Hook 130 may be formed from a bent piece of metal such as steel. Other suitable materials for forming hook 130 will be apparent to one of ordinary skill in the art.

Hook 130 is movably coupled to base 110. Hook 130 is coupled in such a manner that a distance between base 110 and hook 130 is adjustable, in order to use hook 130 to secure base 110 to pallet jacks having different shapes or sizes.

In an exemplary embodiment, hook 130 is coupled to the front side 112 of base 110 via at least one strap 132. Strap 132 is coupled to hook 130 and passes through slot 116 in front side 112 of base 110. Strap 132 may include a ratchet 134 configured to adjust the length of strap 132. In this manner, the length of strap 132 may be adjusted between hook 130 and slot 116 to ensure a secure engagement of hook 130 to the underside 54 of pallet jack 50.

The invention is not limited to the use of a ratcheting strap to couple hook 130 to base 110. Alternatively, hook 130 may be coupled to base 110 via an adjustable metal strap or an adjustable length pole. Other suitable structures for coupling hook 130 to base 110 will be known to one of ordinary skill in the art from the description herein.

Clamping element 150 is coupled to base 110. At least a portion of clamping element 150 is positioned to extend underneath head 52 of pallet jack 50 when base 110 is positioned on the head 52 of pallet jack 50. Clamping element 150 thereby exerts a force on the underside of head 52 to clamp base 110 to head 52. Clamping element 150 may be formed from a rigid material or may be partially or fully flexible in order to conform to the contour of the underside of head 52 of pallet jack 50. Suitable materials for forming clamping element 150 will be apparent to one of ordinary skill in the art.

Clamping element 150 may be coupled to the rear side 114 of base 110. Clamping element 150 is preferably coupled to a side of base 110 opposite hook 130, in order to stably secure base 110 in position on head 52 of pallet jack 50. The use of the terms "front side" and "rear side" herein are not intended to refer to any specific portions or directions of pallet jack 50. To the contrary, "front" and "rear" are used herein merely to denote opposite sides of base 110, and are not intended to be limiting to a particular or specific side or direction of base 110 relative to pallet jack 50.

In an exemplary embodiment, clamping element 150 comprises a U-bolt having a bottom 152 and a pair of ends 154. Bottom 152 extends underneath head 52 of pallet jack 50, and contacts the underside thereof. Ends 154 extend through the pair of holes 120 in base 110. To secure base 110 to head 52 of pallet jack 50, each of ends 154 may be drawn through a respective one of the pair of holes 120 and tightened in place using fasteners, e.g., one or more nuts and/or washers 156.

Apparatus 100 is not limited to the above-described components, but may include alternative or additional components as would be understood by one of ordinary skill in the art from the description herein.

Apparatus 100 may further include one or more tabs 160. Tabs 160 may be coupled to either side surface of base 110 (adjacent front side 112 and rear side 114). Tabs 160 may be provided to further stabilize base 110 on head 52 of pallet jack 50 by providing support on the sides of base 110 (separate from the support provided by hook 130 and clamping element 150 at the front and rear of base 110).

In an exemplary embodiment, each tab 160 includes a first surface 162 and a second surface 164. First surface 162 engages with a respective side of base 110. The engagement between first surface 162 and the side of base 110 may, for example, be a sliding engagement. This sliding engagement may be defined by a slot in first surface 162 of tab 160 and a mating screw, bolt, or projection formed on the side surface of base 110. In this embodiment, tabs 160 are slidably coupled to the sides of base 110 to enable movement from an upper position in which tabs 160 do not stabilize base 110 to a lower position in which tabs 160 stabilize base 110.

Second surface 164 engages with a surface of pallet jack 50 when base 110 is positioned on head 52 of pallet jack 50. This engagement may be a frictional or pressure engagement, or may comprising fixing the second surface 164 of tabs 160 to a surface of pallet jack 50.

Apparatus 100 may further include an extender 170. Extender 170 is coupled to base 110. Extender 170 extends upward from base 110 away from head 52 of pallet jack 50. Extender 170 may be used to provide an elevated surface on which to mount the object to be mounted (e.g., for convenience of the user). In this embodiment, extender 170 provides the foundation for mounting the object to be mounted to pallet jack 50. An adaptor plate 171 may be coupled to extender 170 to facilitate the mounting of an object on extender 170. Additionally, suitable adaptor and/or mounting structures for facilitating the mounting of the object to extender 170 are set forth above and will be known to one of ordinary skill in the art from the description herein.

In an exemplary embodiment, extender 170 comprises a pole mount. The pole mount may have a fixed length, or may be a telescoping pole mount having an adjustable length.

Figure 1C:
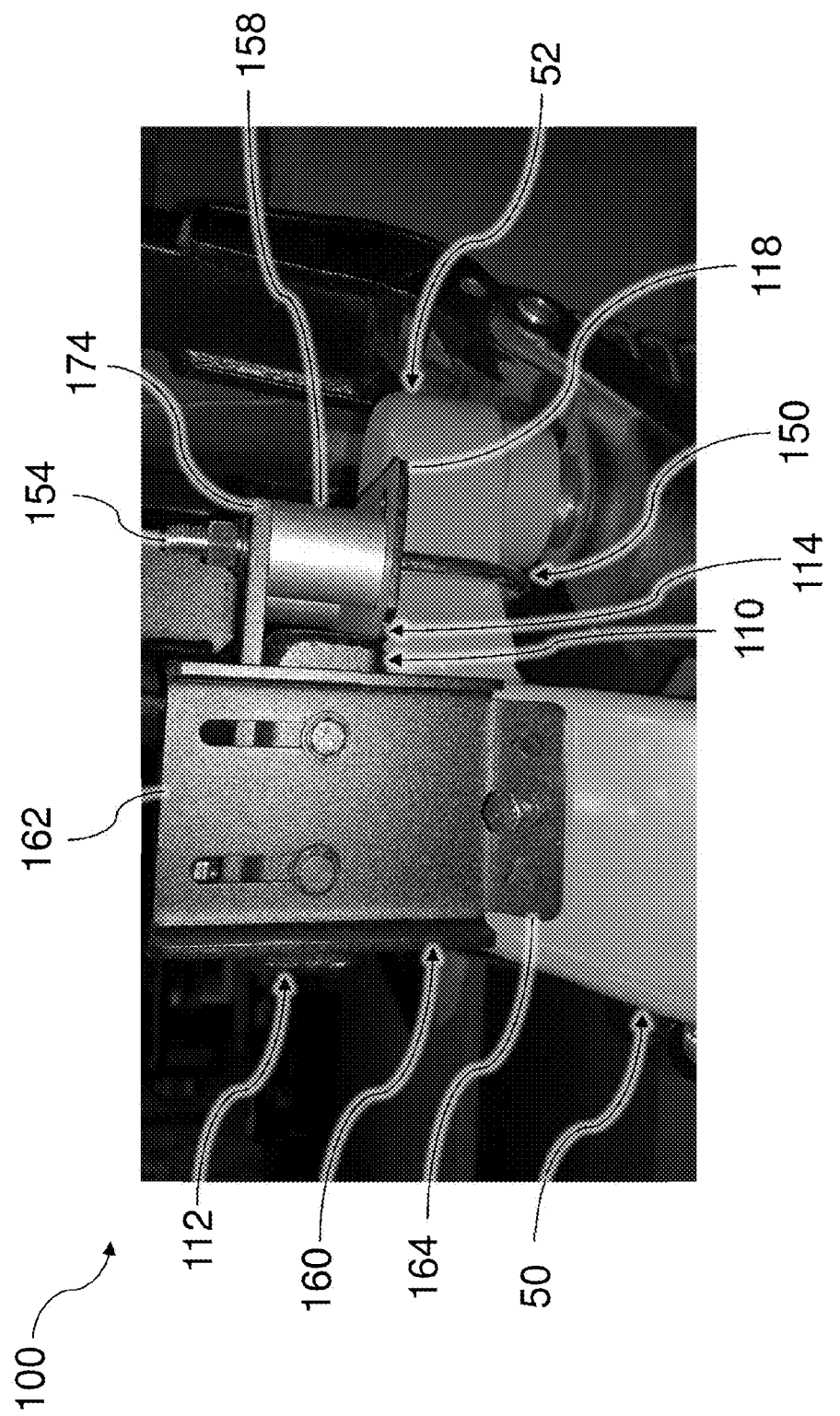

Extender 170 may be releasably coupled to base 110 and/or clamping element 150. In an exemplary embodiment, extender 170 includes a plurality of holes 172 in a lower surface 174 thereof. Extender 170 may be coupled to base 110 by screws and/or bolts 176 inserted through holes 172 and mating holes formed in base 110. In a further embodiment, where clamping element 150 is a U-bolt, ends 154 of the U-bolt may be inserted through holes 172 in the lower surface 174 of extender 170. In this embodiment, clamping element 150 may further include spacers 158 positioned on the U-bolt between base 110 and extender 170, as shown in FIG. 1C.

Figure 3:
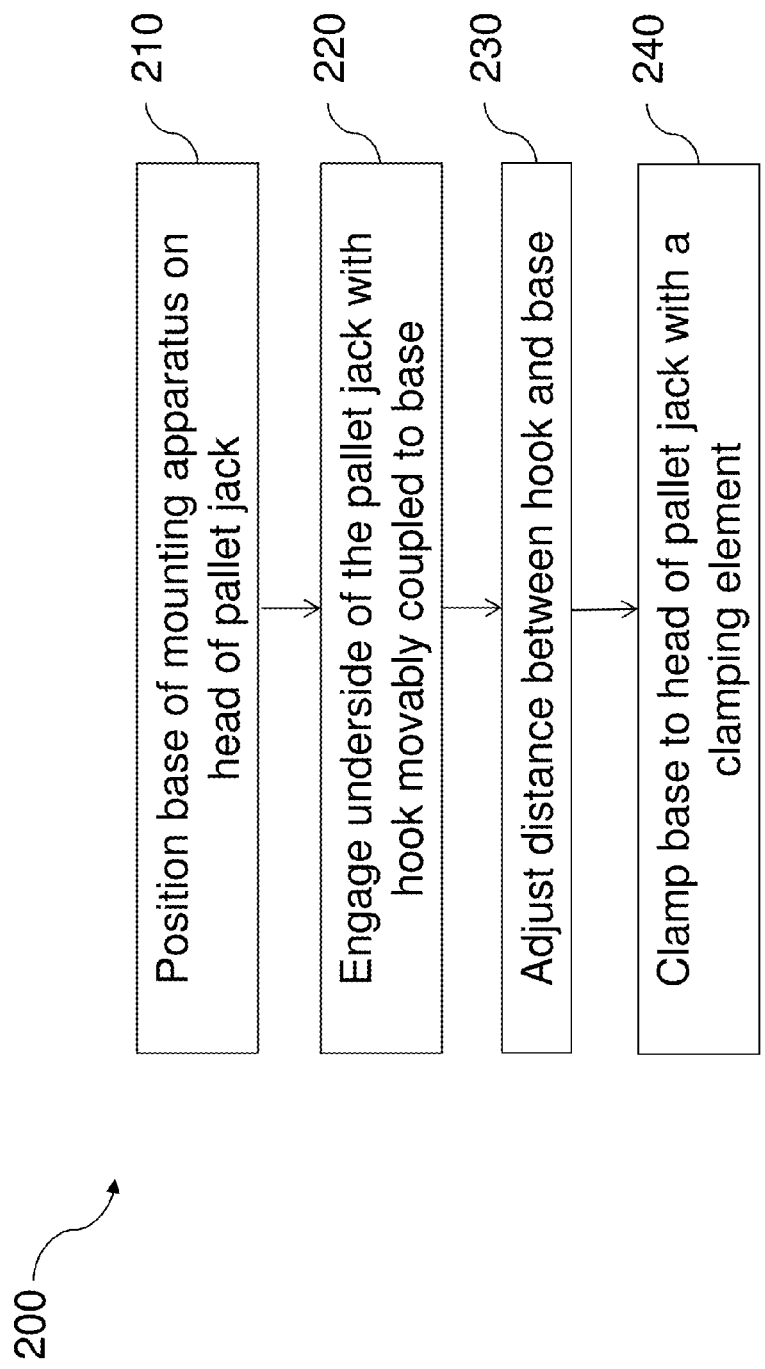
FIG. 3 is a flow chart of an exemplary method for mounting an object to a pallet jack in accordance with aspects of the present invention.

FIG. 3 illustrates an exemplary method 200 for mounting an object to a pallet jack in accordance with aspects of the present invention. Method 200 is usable to securely mount objects, such that they can be readily secured within or removed from the pallet jack. Like apparatus 100, method 200 is usable to securely mount electronic devices such as tablets and phones. In general, method 200 includes positioning a base, engaging an underside of the pallet jack, adjusting a hook, and clamping the base. Additional details of method 200 are provided herein with reference to the components of apparatus 100.

In step 210, a base is positioned on a head of the pallet jack. In an exemplary embodiment, base 110 of apparatus 100 is positioned on head 52 of pallet jack 50.

In step 220, an underside of the pallet jack is engaged with a hook. In an exemplary embodiment, hook 130 is engaged to the underside 54 of pallet jack 50. Hook 130 is movably coupled to base 110, in order to use hook 130 to secure base 110 to pallet jacks having different shapes or sizes.

In step 230, a distance between the hook and base is adjusted. In an exemplary embodiment, a distance between hook 130 and base 110 is adjusted. In a preferred embodiment, a length of strap 132 between the hook 130 and base 110 is adjusted with ratchet 134.

In step 240, the base is clamped to the head of the pallet jack. In an exemplary embodiment, base 110 is clamped to head 52 of pallet jack 50 with clamping element 150. Clamping element 150 includes a portion extending underneath head 52, which exerts a force on the underside of head 52 to clamp base 110 to head 52.

In a preferred embodiment, clamping element 150 comprises a U-bolt with a bottom 152 positioned underneath head 52 of pallet jack 50, such that ends 154 of the U-bolt extend upward through a pair of holes 120 in base 110. The U-bolt is then tightened to base 110 using, e.g., one or more nuts and/or washers 156.

Method 200 is not limited to the above-described steps, but may include alternative or additional steps, as would be understood by one of ordinary skill in the art from the description herein.

For example, method 200 may further include stabilizing the base on the head of the pallet jack. In an exemplary embodiment, apparatus 100 includes tabs 160 as set forth above. In this embodiment, base 110 is stabilized on head 52 of pallet jack 50 by engaging pallet jack 50 with a pair of tabs 160 coupled on either side of base 110. Tabs 160 may engage pallet jack 50 by sliding tabs 160 downward relative to base 110 until they engage pallet jack 50 (e.g., by contacting or pressing against pallet jack 50).

For another example, method 200 may further include providing an extender on the base. In an exemplary embodiment, extender 170 is coupled to extend upward from base 110 away from head 52 of pallet jack 50. Extender 170 provides an elevated surface to serve as the foundation for mounting the object to be mounted to pallet jack 50. Method 200 may further include mounting the object (such as an electronic device) to the end of extender 170 opposite base 110.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. An apparatus for mounting an object to a pallet jack comprising:
   a base having a front and a rear, the base sized to be positioned on a head of the pallet jack;
   a hook sized to engage an underside of the pallet jack, the hook movably coupled to the front of the base such that a distance between the base and the hook is adjustable;
   a clamping element coupled to the rear of the base, the clamping element comprising a U-bolt including at least a portion positioned to extend underneath the head of the pallet jack when the base is positioned on the head of the pallet jack; and
   an extender coupled to the base, the extender comprising a pole mount extending upward from the base away from the head of the pallet jack, the pole mount comprising a pair of holes positioned to receive ends of the U-bolt.

2. The apparatus of claim 1, wherein the hook is coupled to the front of the base via at least one strap.

3. The apparatus of claim 2, wherein the at least one strap comprises a ratchet configured to adjust a length of the at least one strap between the base and the hook.

4. The apparatus of claim 1, wherein the rear of the base comprises a pair of holes positioned to receive the ends of the U-bolt.

5. The apparatus of claim 1, further comprising a pair of tabs coupled to sides of the base, each of the pair of tabs comprising a first surface engaging the base and a second surface engaging the pallet jack when the base is positioned on the head of the pallet jack.

6. The apparatus of claim 5, wherein the pair of tabs are slidably coupled to the sides of the base.

7. The apparatus of claim 1, wherein the pole mount is releasably coupled to the base.

8. The apparatus of claim 1, wherein the U-bolt comprises a pair of spacers between the pole mount and the base.

9. A method for mounting an object to a pallet jack comprising:
   positioning a base of a mounting apparatus on a head of the pallet jack;
   engaging an underside of the pallet jack with a hook movably coupled to the base;
   adjusting a distance between the hook and the base; and
   clamping the base to the head of the pallet jack with a clamping element positioned to extend underneath the head of the pallet jack.

10. The method of claim 9, wherein the adjusting comprises:
    adjusting a length of at least one strap between the hook and the base with a ratchet.

11. The method of claim 9, wherein the clamping element comprises a U-bolt, and the clamping comprises:
    positioning the U-bolt underneath the head of the pallet jack such that each end of the U-bolt extends through a respective one of a pair of holes in the base; and
    tightening the U-bolt to the base.

12. The method of claim 9, further comprising:
stabilizing the base on the head of the pallet jack by engaging the pallet jack with a pair of tabs coupled to sides of the base.

13. The method of claim 12, wherein the stabilizing comprises:
sliding the pair of tabs relative to the base until they engage the pallet jack.

14. The method of claim 9, further comprising:
coupling an extender to the base, the extender extending upward from the base away from the head of the pallet jack.

15. The method of claim 14, further comprising:
mounting the object to an end of the extender opposite the base.

16. A pallet jack comprising:
a pallet jack body having a head;
forks coupled to the pallet jack body and positioned forward of the head;
a handle coupled to the pallet jack body and positioned rearward of the head;
a base positioned on the head, the base comprising a mounting surface for mounting an object directly or indirectly to the base;
a hook engaging an underside of the pallet jack body between the forks, the hook movably coupled to the base such that a distance between the base and the hook is adjustable; and
a clamping element coupled to the base, at least a portion of the clamping element extending underneath the head to clamp the base to the head.

* * * * *